US012743263B2

(12) United States Patent
Chibon et al.

(10) Patent No.: US 12,743,263 B2

(45) Date of Patent: Sep. 22, 2026

(54) SCALING OUT AUTOMATION DISTRIBUTIONS USING A PUBLICATION-SUBSCRIPTION MESSAGE SYSTEM

(71) Applicant: Red Hat, Inc., Raleigh, NC (US)

(72) Inventors: Pierre-Yves Chibon, Saint-Pol-de-Léon (FR); Adam John Miller, Austin, TX (US)

(73) Assignee: Red Hat, Inc., Raleigh, NC (US)

(*) Notice: Subject to any disclaimer, the term of this patent is extended or adjusted under 35 U.S.C. 154(b) by 174 days.

(21) Appl. No.: 18/233,095

(22) Filed: Aug. 11, 2023

(65) Prior Publication Data

US 2025/0053404 A1 Feb. 13, 2025

(51) Int. Cl.

*G06F 9/44* (2018.01)
*G06F 8/65* (2018.01)
*H04L 67/00* (2022.01)

(52) U.S. Cl.

CPC ................ *G06F 8/65* (2013.01); *H04L 67/34* (2013.01)

(58) Field of Classification Search

CPC ........................................................ G06F 8/65
USPC ......................................................... 717/172
See application file for complete search history.

(56) References Cited

U.S. PATENT DOCUMENTS 5,841,793 A * 11/1998 Fukuda ................ H04N 5/9261 386/E5.013
6,178,426 B1 * 1/2001 Klein .................. G06F 16/9554 707/999.102
6,976,062 B1 * 12/2005 Denby .................... H04L 67/62 709/219
8,533,608 B1 * 9/2013 Tantiprasut ............ G06Q 10/06 715/751
9,047,155 B2 6/2015 DeHaan
10,013,491 B2 7/2018 Vasudevan et al.
10,972,342 B2 4/2021 Shenoy et al.

(Continued)

FOREIGN PATENT DOCUMENTS

| | | | |
|---|---|---|---|
| CN | 115150244 A | 10/2022 | |
| CN | 117331692 A * | 1/2024 | |
| EP | 3971665 B1 * | 8/2024 | ......... G05B 19/0425 |

OTHER PUBLICATIONS

Xu, Chunlei, "Design of Real-time Message Synchronization cross Smart Grid Dispatching System," 2020 IEEE 4th Conference on Energy Internet and Energy System Integration (E12), Oct. 30 to Nov. 1, 2020, pp. 1-6, Wuhan, China.

(Continued)

*Primary Examiner* — Evral E Bodden

(74) *Attorney, Agent, or Firm* — Womble Bond Dickinson (US) LLP

(57) ABSTRACT

Techniques for distributing automation packages are disclosed. An example method includes receiving a playbook that includes a task to be performed by a set of target devices. The method also includes generating an automation package that includes the task included in the playbook. The method also includes encapsulating the automation package in one or more messages, where the one or more messages include a topic identifier that identifies a topic corresponding to the set of target devices. The method also includes sending, by a processing device, the one or more messages to a message service to be published to the topic, where the set of target devices are configured to subscribe to the topic.

20 Claims, 6 Drawing Sheets

(56) References Cited

U.S. PATENT DOCUMENTS

| | | | | |
|---|---|---|---|---|
| 11,435,871 | B1 * | 9/2022 | Luvaas | G06F 3/04817 |
| 11,531,530 | B1 | 12/2022 | Henry et al. | |
| 11,947,342 | B1 * | 4/2024 | Mazur | G06T 7/0004 |
| 12,362,927 | B2 * | 7/2025 | Marco | H04L 9/0866 |
| 2016/0357778 | A1 * | 12/2016 | Mackenzie | G06F 13/36 |
| 2018/0013610 | A1 * | 1/2018 | Shen | H04L 67/1078 |
| 2023/0008839 | A1 * | 1/2023 | Henry | G06F 8/61 |
| 2024/0036847 | A1 * | 2/2024 | Shin | H04L 67/12 |

OTHER PUBLICATIONS

Husler, Roman, Event-Driven Architecture with Ansible and Kafka: How to automate your IT with an event driven architecture (kaftka and event driven ansible), https://blog.opensight.ch/event-driven-architecture-with-ansible-and-kafka/, Feb. 13, 2023, pp. 1-7.

Confluent Inc., "Scale Confluent Platform Clusters using Ansible," https://docs.confluent.io/ansible/current/ansible-scale.html, Jun. 3, 2023, pp. 1-2.

* cited by examiner

Check message service for new messages available for a specific topic 302

Receive new messages from message service 304

Filter received messages to eliminate deprecated automation packages 306

Combine segmented automation packages divided between different messages 308

Execute tasks included in automation packages 310

Return acknowledgements through the message service 312

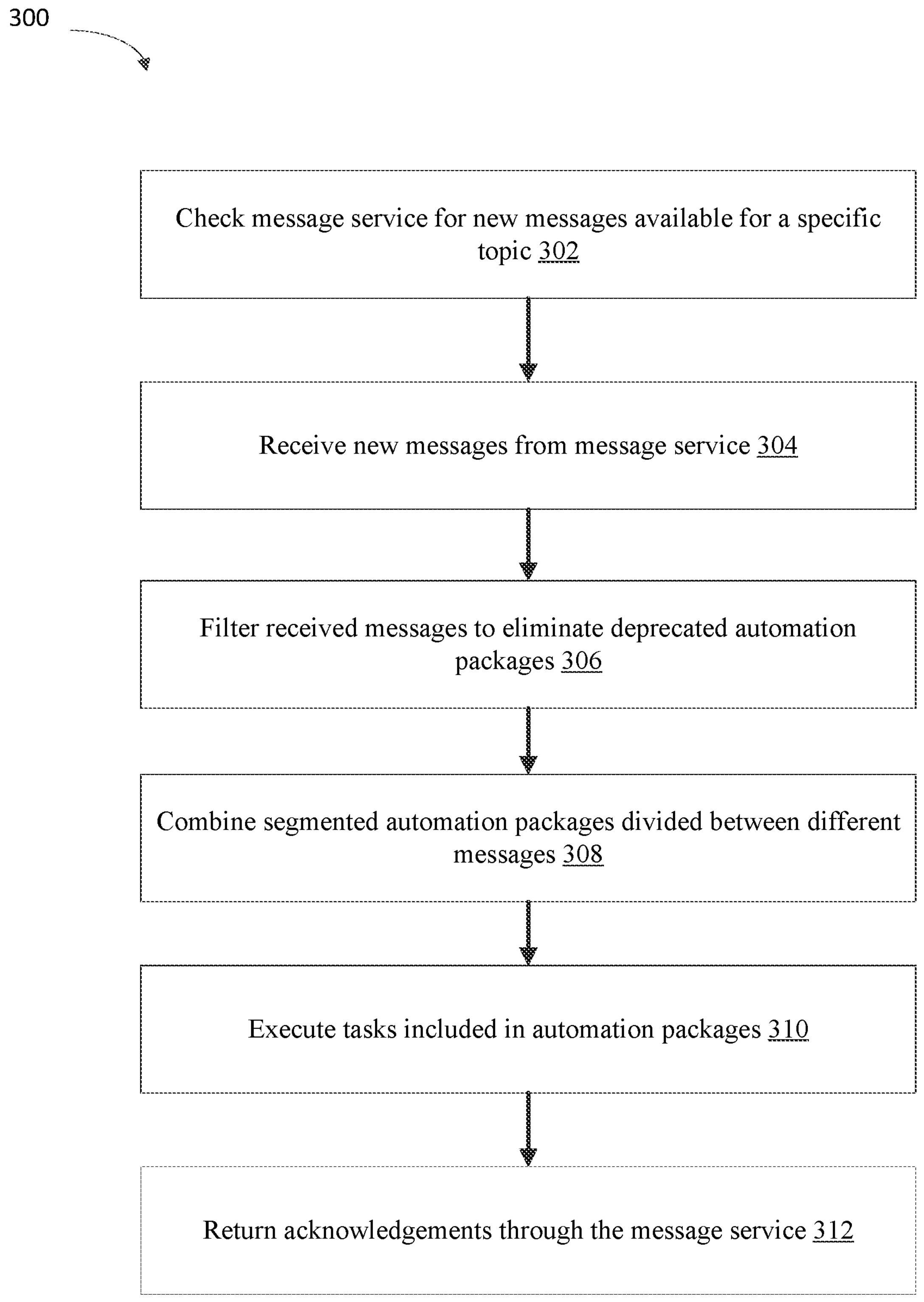

Generate an automation package that includes the task included in the playbook 404

Encapsulate the automation package in one or more messages, wherein the one or more messages include a topic identifier that identifies a topic corresponding to the set of target devices 406

Send the one or more messages to a message service to be published to the topic, wherein the set of target devices are configured to subscribe to the topic 408

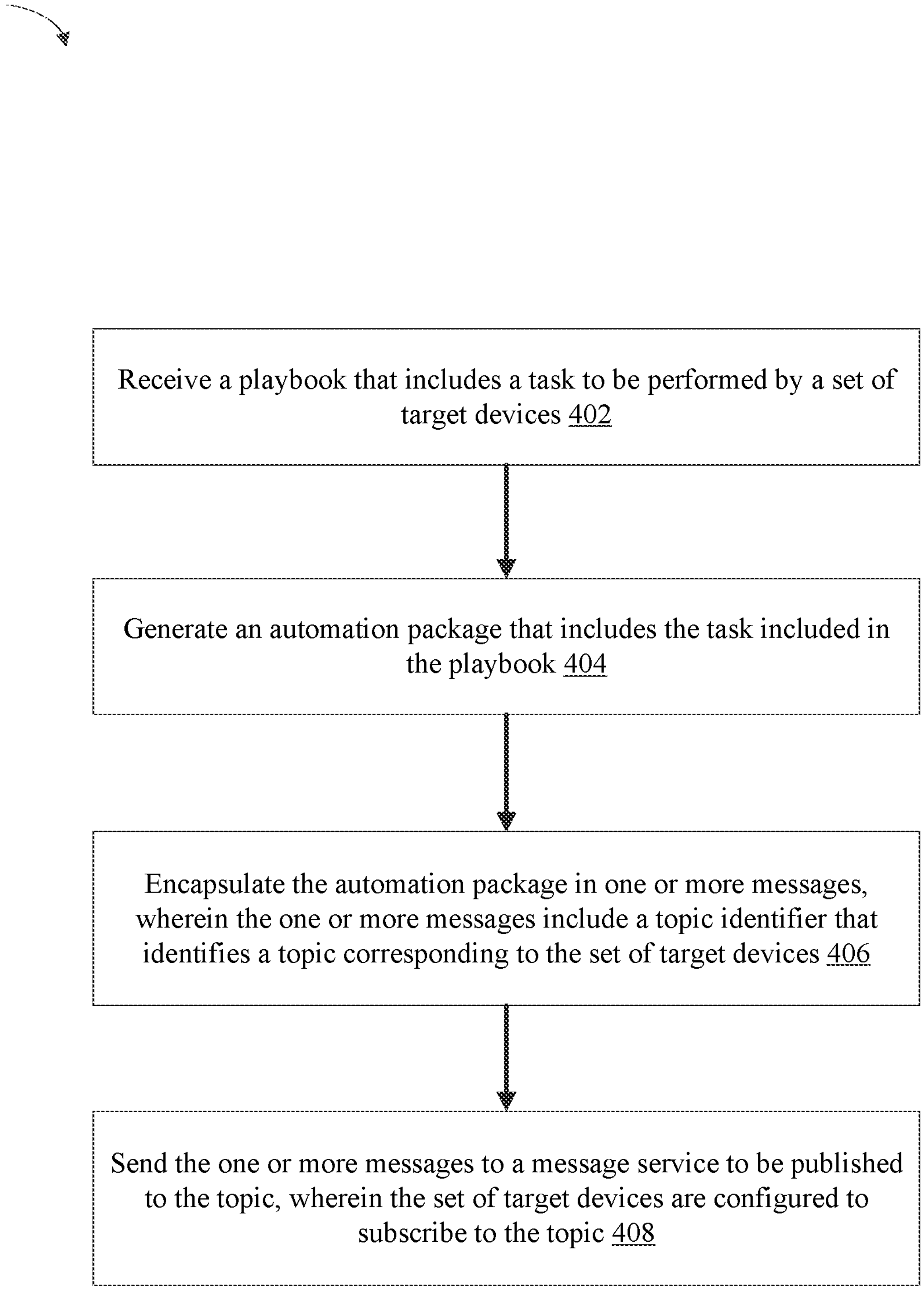

Fig. 4

SCALING OUT AUTOMATION DISTRIBUTIONS USING A PUBLICATION-SUBSCRIPTION MESSAGE SYSTEM

TECHNICAL FIELD

Aspects of the present disclosure relate to techniques for distributing automation payloads through a publication-subscription message service such as a message bus.

BACKGROUND

Ansible is a popular open-source suite of software tools that can be used to automate a variety of operations related to computing resources, including configuration management, application deployment, cloud provisioning, task execution, network automation, and multi-node orchestration. In the past, such operations would generally be performed by a human operator that logs into a computing system to manually perform tasks. As computing infrastructure increases in size and complexity, the manual performance of these tasks may become time consuming and error prone. The automation provided by Ansible can be used to orchestrate changes over thousands of devices while reducing the level of human involvement in provisioning, installing, configuring, and maintaining computing resources. Ansible-based services may be provided as a subscription product such as the Red Hat® Ansible® Automation Platform.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a process flow diagram summarizing a method of consuming automation packages in accordance with some embodiments of the present disclosure.

FIG. 4 is a process flow diagram summarizing a method of distributing automation packages in accordance with some embodiments of the present disclosure.

DETAILED DESCRIPTION

Figure 1:
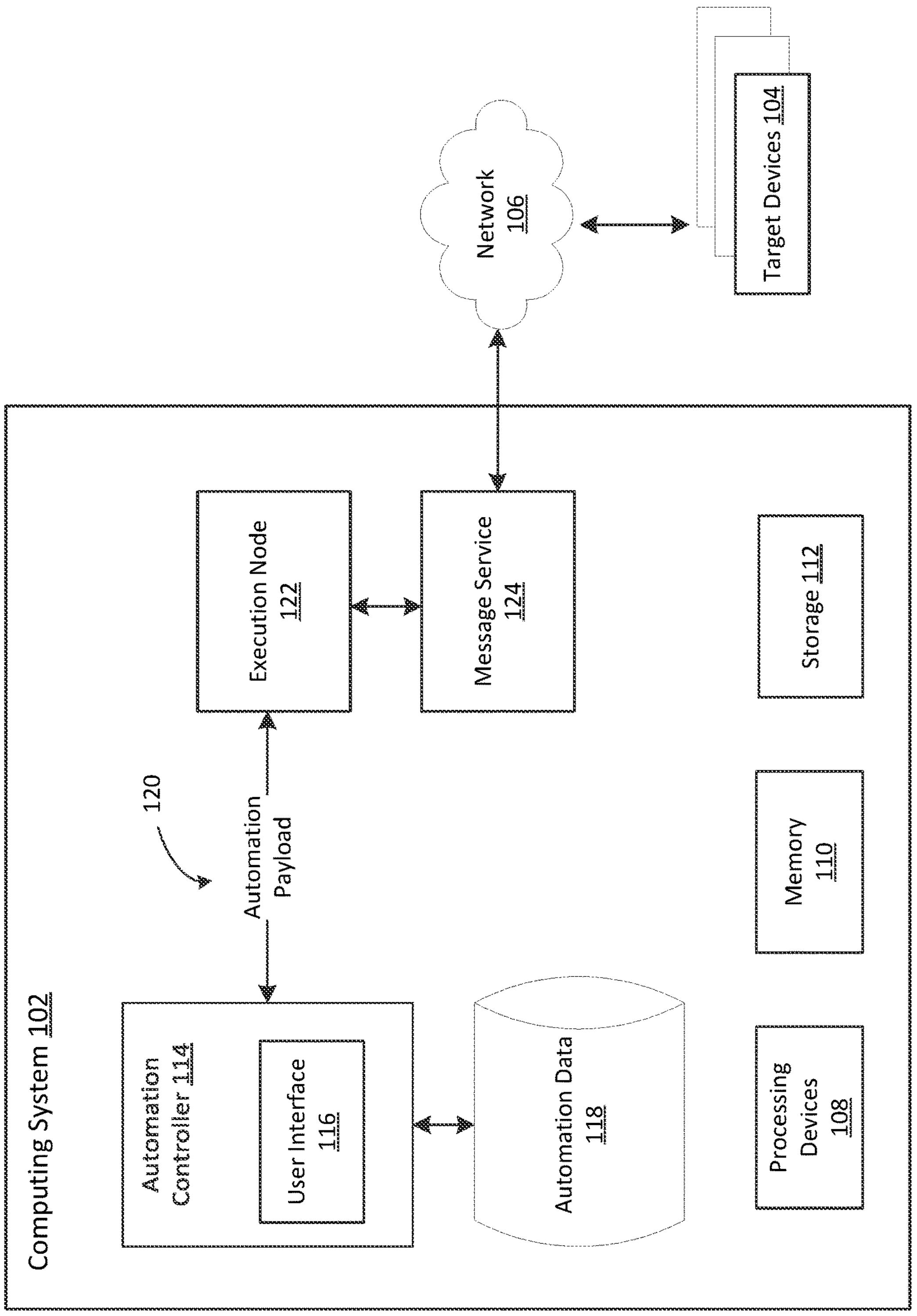
FIG. 1 is a block diagram of an example computing system that can be used to host an automation platform in accordance with some embodiments of the present disclosure.

Aspects of the present disclosure relate to techniques for distributing automation payloads through a message system. Embodiments of the present disclosure may be applied to an automation platform, such as an automation platform based on Ansible. As described above, Ansible is a suite of software tools that can be used to automatically orchestrate changes over thousands of devices, thereby reducing the level of human involvement in provisioning, installing, configuring, and maintaining computing resources. As used herein, the term "automatic" or "automatically" refers to performance by machines or devices without human involvement. Ansible-based services may be provided as a subscription product such as the Red Hat® Ansible® Automation Platform.

Ansible updates can be distributed using a push model or a pull model, both of which are based on a request-response architecture. In the push model, the Ansible platform can connect to the targeted devices sequentially or in parallel via a network protocol such as the Secure Shell Protocol (SSH). The Ansible platform is then able to push automation packages that can be executed on the target device to perform the desired changes. The targeted device can then return acknowledgments back to the Ansible platform. This push model requires an active network connection between the Ansible platform and targeted device through the entire update process. If the targeted device does not have access to a network, the Ansible platform is unable to push payloads to the targeted device. Additionally, if the network connection fails after an update process is initiated, the update process will fail and may need to be restarted, resulting is wasted network and computing resources.

In the pull model, Ansible software (e.g., ansible-core) can be installed on the targeted devices. When the target device has access to a network, the target device can establish a connection with Ansible platform managing the update. The Ansible platform can then instruct the targeted device to retrieve a playbook, which is runs locally on the targeted device. This may be a more useful model in situations where the target devices have sporadic network access. However, in this pull model, the Ansible platform does not receive acknowledgements from the target devices regarding the success or failure of the update. Thus, the Ansible platform would have no way of obtaining information regarding the status of the target devices.

Aspects of the disclosure address the above-noted and other deficiencies by providing a system for distributing automation packages via a message service that uses a publish-subscribe distribution model that supports asynchronous message-passing. As used here, the term "asynchronous" refers a communication technique that does not rely on a direct, open communication channel between the sender and receiver, but it facilitated by an intermediary that can store messages and support long delays (e.g., hour, day, week, month, etc.) between transmission of a message by the sender and subsequent receipt of the message by the receiver.

In accordance with embodiments of the present disclosure, automation packages are encapsulated in one or more messages that are sent to the message service and associated with a specific topic that stores messages and acts as a communication channel between senders and receivers. The target devices can be configured to subscribe to a specific topic and retrieve messages associated with that topic. The target devices then execute the automation package and send acknowledgements back the automation platform over the message service via a different topic. The automation platform is then able to aggregate the acknowledgement information received from the target devices to provide a complete description of the results of the automation job.

The techniques described herein improve the distribution of automation payloads by allowing target devices to receive automation packages from an automation platform (such as an Ansible-based platform) asynchronously, while also enabling the target devices to return acknowledgements to the automation platform asynchronously. In accordance with embodiments, the target devices can retrieve automation packages and return acknowledgements as opportunities arise to access network resources. Since an open network connection between the automation platform and the target devices is not required, the automation process can proceed successfully even if the target device loses network connectivity after an automation package is received. These improvements may be particularly useful for target devices that may have sporadic network access, such as automobiles or other types of vehicles.

Some aspects of the techniques disclosed herein may be described in relation to Ansible-based automation platforms. However, it will be appreciated that these techniques may also be applicable to other types of automation platforms, such as Chef-based platforms, Puppet-based platforms, Terraform-based platforms, and others.

FIG. 1 is a block diagram of an example computing system 102 that can be used to host an automation platform in accordance with some embodiments of the present disclosure. One skilled in the art will appreciate that other architectures are possible for computing system 102 and any components thereof, and that the implementation of a system utilizing examples of the disclosure are not necessarily limited to the specific architecture depicted by FIG. 1. The computing system 102 may be a cloud-based infrastructure configured, for example, as Service as a Service (SaaS) or Platform as a Service (PaaS). The computing system 102 may also be a non-cloud-based system such as a personal computer, one or more servers communicatively coupled through a network, and other configurations.

The computing system 102 may be coupled to target devices 104 through a network 106. Each target device 104 may be any suitable type of computing device or machine that has a programmable processor including, for example, server computers, desktop computers, laptop computers, smartphones, Internet of Things (IoT) devices (e.g., sensors, household appliances, home automation devices, etc.), network devices (switches, routers), vehicular systems (e.g., airplanes, ships, trains, automobiles), satellite electronics, industrial control systems, and others. In some examples, each of the target devices 104 may comprise a single machine or may include multiple interconnected machines (e.g., multiple servers configured in a cluster). The computing system 102 and target devices 104 may be implemented by a common entity/organization or may be implemented by different entities/organizations.

The network 106 may be a public network (e.g., the internet), a private network (e.g., a local area network (LAN) or wide area network (WAN)), or a combination thereof. In one embodiment, the network 106 may include a wired or a wireless infrastructure, which may be provided by one or more wireless communications systems, such as a WiFi router connected with the network 106 and/or a wireless carrier system such as 4G or 5G that can be implemented using various data processing equipment, communication towers (e.g. cell towers), etc. In some embodiments, the network 106 may be an L3 network. The network 106 may carry communications (e.g., data, messages, packets, frames, etc.) between the computing system 102 and the target devices 104.

The computing system 102 can include one or more processing devices 108 (e.g., central processing units (CPUs), graphical processing units (GPUs), etc.), main memory 110, which may include volatile memory devices (e.g., random access memory (RAM)), non-volatile memory devices (e.g., flash memory) and/or other types of memory devices, and a storage device 112 (e.g., one or more magnetic hard disk drives, a Peripheral Component Interconnect [PCI] solid state drive, a Redundant Array of Independent Disks [RAID] system, a network attached storage [NAS] array, etc.). In certain implementations, main memory 110 may be non-uniform access (NUMA), such that memory access time depends on the memory location relative to processing device 108. The storage device 112 may be a persistent storage and may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The storage device 112 may be configured for long-term storage of data. It should be noted that although, for simplicity, a single processing device 108, main memory 110, storage device 112, are shown, other embodiments may include a plurality of processing devices, memories, and storage devices. Additionally, the computing system 102 may have additional components not shown in FIG. 1. The target devices 104 may include similar architectures.

In some embodiments, the computing system 102 may be configured as a scalable, distributed computing system, such as a container orchestration platform. A container orchestration platform is a platform for developing and running containerized applications and may allow applications and the data centers that support them to expand from just a few machines and applications to thousands of machines that serve millions of clients. Container orchestration platforms may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database, though containers can be used for arbitrary workloads. The container orchestration platform may scale a service in response to workloads by instantiating additional containers with service instances in response to an increase in the size of a workload being processed by the nodes. One example of a container orchestration platform in accordance with embodiments is the Red Hat™ OpenShift™ platform built around Kubernetes.

The computing system 102 may be used for generating and executing automation payloads 120. Once launched, the automation payload 120 directs the operations of the computing system 102 to distribute units of automation, referred to herein as automation packages, to the target devices 104. The automation payload 120 may be configured to perform any of a variety of automated tasks, such as executing software updates (e.g., patches), implementing configuration changes, provisioning cloud resources, and others. For example, the automation payload 120 may be configured to perform tasks related to a user's Information Technology (IT) infrastructure, such as provisioning infrastructure, improving security and compliance, installing software, patching system, and others. In some embodiments, the automation payload 120 may be configured to target devices that may not have consistent and reliable access to the network 106, such as automobiles or other types of vehicles (e.g., ships, boats, planes, tractor-trailers, etc.). With regard to automobiles, the automation payload may be configured to deliver updates to the automobile's artificial intelligence (AI) algorithm, human machine interface (MII), electronic control units (ECU), etc. Those of ordinary skill in the art will recognize a wide variety of additional applications for the techniques described herein.

The computing system 102 may include an automation controller 114 that can be accessed through a user interface 116 for the creating and configuring automation payloads. The process for executing an automation payload 120, distributing automation packages to target devices 104, and documenting the results may be referred to as a job. For example, a job may refer to an instance of automation controller launching an automation payload against an inventory of target devices 104, also referred to as hosts or host devices.

The automation controller 114 may be coupled to a database of automation data 118 that can be used to create the automation payload 120 and define the parameters of a job. For example, the automation data 118 may include an inventory of target devices, scripts and/or code modules to be executed on the target devices, and other information. The automation payload 120 may include a playbook (e.g., Ansible playbook) that describes a set of tasks to be performed at the target devices 104. Once the job has been defined, the job may be initiated manually by the user or in accordance with a schedule defined by the user.

When the job is initiated, the automation payload 120 may be sent by the automation controller 114 to an execution node 122, which executes the automation payload 120 and collects status information from the target devices 104. In some embodiments, the execution node 122 may be configured to launch one or more containers for executing the automation payload in a distributed computing system.

During the execution of the automation payload 120, the execution node 122 processes the playbook to identify automation tasks to be performed on the target devices 104 and generates corresponding automation packages to be delivered to the target devices 104. The automation packages may be encapsulated in messages to be delivered to a message service 124, which handles communication between the execution node 122 and the target devices 104.

The message service 124 may be any suitable publication-subscription messaging technology, including message busses that operate according to the Advanced Message Queuing Protocol (AMQP), the Message Queuing Telemetry Transport (MQTT) protocol, and others. In some embodiments, the message service 124 may also be an event streaming platform such as Apache Kafka. Although the message service 124 is shown in FIG. 1 as a component of the computing system 102, it will be appreciated that the message service 124 may also be included in a separate computing system, including third-party computing systems. The computing system 102 and the message service 124 may be commonly owned and operated or owned and operated by different entities.

Target devices 104 may connect to the message service 124 to determine if there are automation packages available for retrieval. After receiving an automation package, the target device 104 can execute the automation package and return acknowledgements to the execution node 122 through the message service 124. The acknowledgements may include information about the status of a job with respect to specific target devices 104. For example, acknowledgements may include status information regarding whether an automation package was retrieved and whether the automation package or components thereof were successfully executed by the target device. The execution node 122 can use the received acknowledgements to maintain a running log that may be stored to the database of automation data 118 and may be viewed by the user via the user interface 116.

Figure 2:
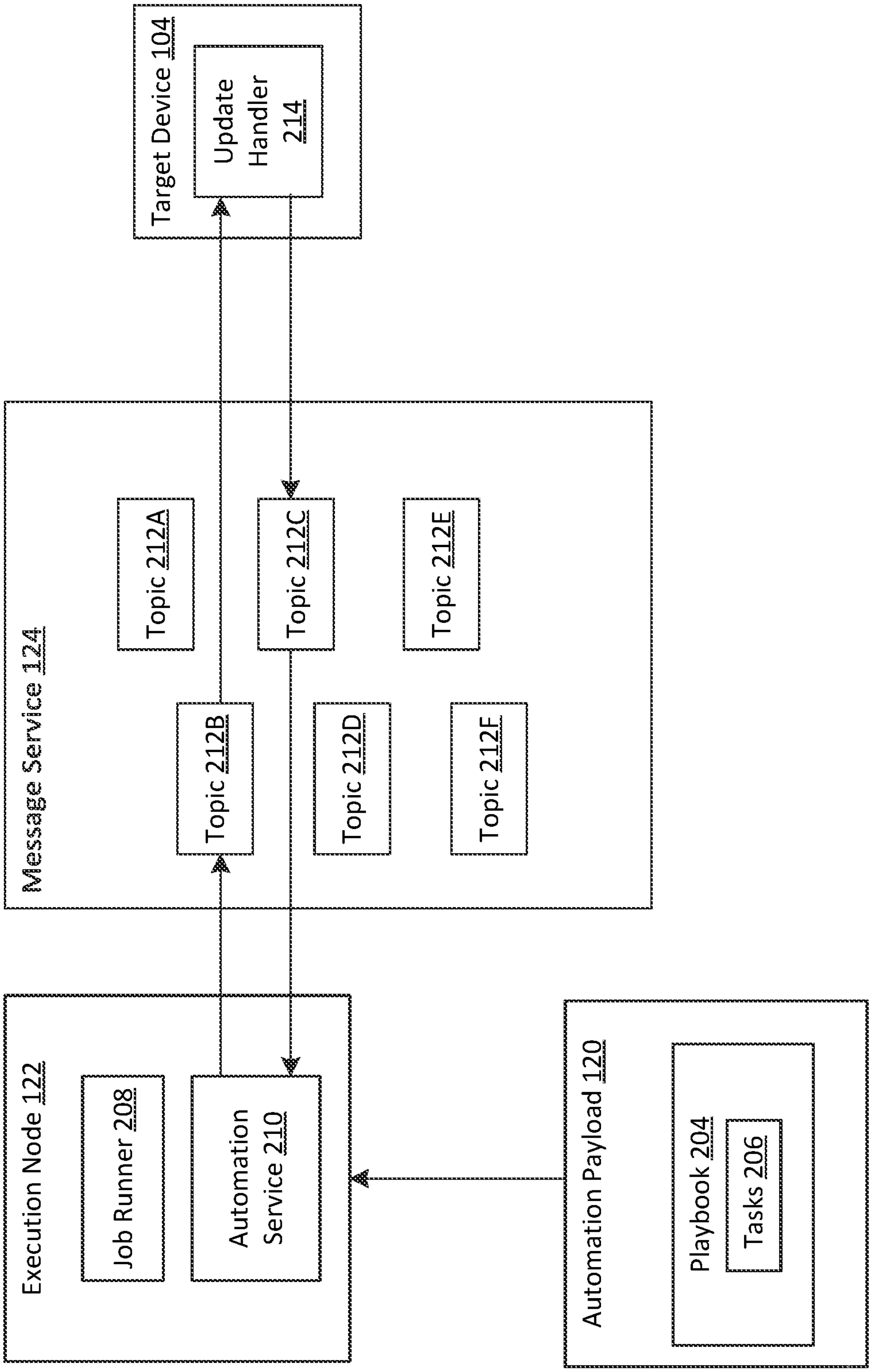
FIG. 2 is a block diagram showing an example technique for distributing automation packages using a message service in accordance with some embodiments of the present disclosure.

A more detailed example of a system for processing an automation job in accordance with embodiments is shown in FIG. 2. It will be appreciated that various alterations may be made to the system 100 and that some components may be omitted or added without departing from the scope of the disclosure.

FIG. 2 is a block diagram showing an example technique for distributing automation packages using a message service in accordance with some embodiments of the present disclosure. As shown in FIG. 2, the automation payload 120 includes a playbook 204, which includes a set of one or more tasks 206 to be performed by a set of target devices 104. Each task 206 may include an identifier that describes the set of target devices 104 to which the task applies.

The execution node 122 may include a job runner 208 (e.g., Ansible Runner) and an automation service 210 (e.g., ansible-playbook). In such embodiments, the automation payload 120 may be delivered to the execution node 122, which provides the automation payload 120 to the job runner 208. The job runner 208 may launch a container and inject the automation payload 120 to the container, which executes the automation service 210. The automation service 210 controls the generation and delivery of automation packages to be sent the target devices 104 through the message service 124. In FIG. 2, the message service 124 is shown as including six topics labeled as topics 212A-212F. However, it will be appreciated that this is just an example and that the message service 124 may include any suitable number of topics 212.

To generate automation packages, the automation service 210 processes the playbook 204 to create automation packages based on the tasks 206 includes in the playbook. The automation package may include a file archive that includes automation scripts and/or code modules to be executed on the target devices 104. The file archive may be a binary file such as type of file referred to as a "tarball" or "tarfile". The automation package may include all the tasks 206 included in the playbook 204 or a subset of the tasks 206. For example, each task 206 from the playbook 204 may be packaged as a separate automation package and sent in separate messages. Dividing the tasks between different automation packages may be useful to reduce the size of the messages. Additionally, the playbook 204 may include tasks 206 that are directed to a variety of different target devices 104. In some embodiments, a subset of tasks 206 directed to one group of target devices 104 may be a packaged separately from another subset of tasks 206 directed to a different group of target devices 104 so that the resulting messages can be published to the appropriate topics 212. As used herein, the term "subset" may be used to refer to a single member of the set.

In some cases, a single automation package may be segmented into two or more binary segments that are each encapsulated in separate messages. This technique, sometimes referred to as "chunking," may be useful in cases where the message service 124 imposes an upper limit on the size of individual messages that can be published, and the generation of the automation package results in a binary file that exceeds this upper limit. If an automation package is chunked and split between different messages, each message may include header information that enables the automation package to be reassembled by the target device 104.

Each topic 212 is associated with a specific set of target devices 104 that are preconfigured to subscribe to the particular topic applicable for their device type. Users of the message service 124 (publishers and subscribers) may be authenticated by the message service 124 using, for example, digital certificates such as Transport Layer Security (TLS) certificates. The message service 124 may be configured to allow messages targeting a specific topic to be sent only by users authorized for that topic.

When the automation service 210 generates an automation package, it identifies a particular topic 212 based on the devices named in the playbook for a particular task. The automation service 210 encapsulates the automation package into a message with header information that identifies the topic and may also include other information related to features of the automation package. The automation service 210 then sends the message to the message service 124, which adds the message to the identified topic 212. The topic 212 stores the messages and provides them to subscribers when they are available to receive messages. In the example shown in FIG. 2, the automation service 210 publishes the message to topic 212B.

The target devices 104 may include an update handler 214 that is configured to communicate with the message service 124, retrieve automation packages, initiate execution of automation packages, and return acknowledgements back to the automation service 210 through the message service 124. The update handler 214 may any implemented as any suitable logic or programming embodied in software, firmware, hardware, or combinations thereof. For example, update handler 214 may be a plugin (sometimes referred to as an “addin,” “addon”, etc.), a background process such as a daemon, and others.

The target device 104 may be configured to subscribe to a specific topic that is applicable for its device type. For example, in an automotive context, a specific make, model, and year of automobile may be configured to subscribe to a specific topic that will contain automation packages intended for the computing systems in that type of vehicle. In the example in FIG. 2, the target device 104 subscribes to topic 212B. The update handler 214 may be configured to check for new messages periodically, in response to specific events (e.g., network detection), or in response to manual initiation by an operator (e.g., administrator, owner, etc.) of the target device 104. To check for new messages, the update handler 214 can connect to the message service 124 and check the relevant topic 212 to determine whether there are new messages that the target device 104 has not received. Although not shown, there may be additional target devices 104 configured as subscribers to the same topic 212B for receiving the same automation packages. Messages may be stored to the topics 212 until every target device 104 subscribed to the topic 212 has successfully retrieved the message or until the message has expired.

Upon receipt of a new message, the update handler 214 can unpack the automation package and execute any script and/or code modules associated with the tasks included in the automation package. Each task may include a process for bringing the target device 104 or a component thereof to a specified state. The specified state may be, for example, the value of a configuration parameter, a software version, and others. Example tasks may include instructions to install software, update specific software to a latest version, enable or disable specific capabilities, change the value of various configuration parameters or resource names, and others. In some embodiments, the tasks may be idempotent, meaning that a specific task will bring about the same state regardless of the initial state or how many times the task is repeated. In some embodiments, the running script or code module may, for each task, inspect the current state and change the state when the current state differs from the specified state.

The update handler 214 can also return acknowledgments to the automation service 210 via the message service 124. Acknowledgments may describe the state of each task included in an automation package, for example, whether the state of the target device 104 is changed or unchanged, or whether the code module failed to complete the task. Acknowledgments may also describe the information about the automation package itself, such as whether the automation package was received and whether the automation package was successfully executed. Acknowledgments may also include a device identifier that uniquely identifies the specific target device.

The update handler 214 encapsulates the acknowledgements into a message with header information that identifies a topic 212 specified for returning acknowledgements. The update handler 214 then sends the message to the message service 124, which adds the message to the identified topic 212. In the example shown in FIG. 2, the update handler 214 publishes the acknowledgement messages to topic 212C. Although not shown, there may be additional target devices configured to publish acknowledgements to the same topic 212C. The automation service 210 subscribes to topic 212C and retrieves acknowledgements from the target device 104 as well as any additional target devices that may be publishing acknowledgements to topic 212C. Acknowledgements may be removed from the acknowledgement topic as they are received by the automation service 210.

In some embodiments, automation package messages may include header information that identifies features of the automation package, such as a version number, the order within a series of automation packages to be processed together, and others. For example, if tasks of the playbook 204 have been divided between different messages, the automation packages may need to be processed together or in a specific order. Additionally, a single automation package may have been chunked and split between separate messages such that the automation package needs to be reassembled at the target device 104. To enable the update handler 214 the properly order the tasks or assemble the automation package, the corresponding messages may include header information that describes the total number of messages and the ordering of the messages (e.g., “1 of 4”, “2 of 4”, etc.).

In some embodiments, an automation package message may include header information that indicates that previous automation packages are deprecated, meaning that the current automation package supersedes some or all of the previous automation packages, which may be disregarded if they have not been run. This may particularly beneficial if the target device 104 has not checked for new messages for a length of time (due to lack of network access, for example), in which case, the target device 104 may discover that several new automation packages may be available. In some cases, each automation package may need to be processed in the correct order to achieve the correct desired state. However, if an automation package is identified as superseding previous updates, this means that the state achieved after processing the identified automation package will be the same regardless of whether the prior deprecated automation packages are processed. Deprecated automation packages that are superseded by the identified automation package may be disregarded and deleted. In this way, the processing of automation packages may be accomplished more efficiently and avoids unnecessary consumption of processing power that may otherwise be wasted on obsolete automation packages.

The automation service may track the progress of the automation job via the collection of the acknowledgement data received from the target devices 104. The job progress may be stored to a data log and/or displayed to the user through the user interface 116 of FIG. 1, for example. The job runner 208, the automation service 210, and any related containers hosting such services may be terminated at various stages depending on the details of specific implementation. For example, these services may be terminated after all of the target devices 104 have responded and indicated successful completion of the tasks included in a specific job, after a specified time limit, or in response to receipt of termination instructions from the user.

It will be appreciated that various alterations may be made to the techniques described in relation to FIG. 2 and that some components may be omitted or added without departing from the scope of the disclosure. For example, it will be appreciated that there may be several target devices 104 (including hundreds, or several thousands, of devices) subscribing to the topic 212B and publishing to the topic 212C. Additionally, other topics 212 of the same message service 124 may be configured to handle other automation jobs from other automation services. Additionally, the automation service 210 may publish to other topics if the playbook 204 includes tasks 206 to be performed by a different subset of target devices 104.

FIG. 3 is a process flow diagram summarizing a method of consuming automation packages in accordance with some embodiments of the present disclosure. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. The method 300 may be performed by the the update handler 214 running on the target device 104 of FIGS. 1 and 2. The method may begin at block 302.

At block 302, a message service is checked to determine if there are new messages available for a specific topic. The process may be referred to as message polling, which is technique for requesting new messages from an indicated topic. If there are no new messages for that topic, the message service may indicate that no new messages are available. Otherwise, the message service responds by delivering any new messages for that topic to the requesting device. The topic identified in the request may be a predetermined topic that has been defined for delivering automation packages (e.g., software updates) to a specific subset of target devices. In some embodiments, the topic may be specific to a certain device type, model, manufacture, etc.

At block 304, new messages are received from the message service. In cases where a plurality of messages is received, some messages may correspond with tasks that originate from a same playbook (e.g., same automation job) and have been split into different automation packages. Some messages may also correspond with a single automation package that has been chunked and divided between different messages. Additionally, some messages may correspond with tasks that originate from different playbooks (e.g., different automation jobs), in which case some of the automation packages contained in the messages may be deprecated.

At block 306, the received messages are filtered to eliminate deprecated automation packages. The identification of deprecated automation packages may be performed by inspecting the header information contained in the corresponding messages. For example, a particular message may include header information that identifies all prior messages as deprecated.

At block 308, any segmented automation packages divided between different messages are combined to from a single automation package. The identification of segmented automation packages may be performed by inspecting the header information contained in the corresponding messages. For example, a particular message may include header information that identifies a total number of messages that encompass the full automation package and the order of the present message in the series. When all of the relevant messages have been received, the chunked automation packages can be combined to form the full automation package.

At block 310, tasks included in automation packages are executed. Executing each task may involve executing a code module to install software or firmware, perform software or firmware updates, implement configuration changes, etc. The header information in the messages may be used to determine an order in which tasks are to be performed.

At block 312, acknowledgements are returned to the automation platform (e.g., the execution node 122 and/or automation service 210 of FIG. 2) through the message service. In some embodiments, acknowledgements are returned by encapsulating the acknowledgement in a message and publishing the message to a specific topic identified for delivering acknowledgements to the automation service. Acknowledgements may indicate the execution status (success or failure) of particular automation package or task, whether a particular message was received, and other information.

It will be appreciated that embodiments of the method 300 may include additional blocks not shown in FIG. 3 and that some of the blocks shown in FIG. 3 may be omitted. Additionally, the processes associated with blocks 302 through 312 may be performed in a different order than what is shown in FIG. 3.

FIG. 4 is a process flow diagram summarizing a method of distributing automation packages in accordance with some embodiments of the present disclosure. Method 400 may be performed by processing logic that may include hardware, software, firmware, or a combination thereof. The method 400 may be performed by an automation platform such as the computing system 102 of FIG. 1. The method may begin at block 402.

At block 402, a playbook comprising a task to be performed by a set of target devices is received. The playbook may include a plurality of tasks, some of which may be directed to different sets of target devices. In some embodiments, the playbook is an Ansible playbook. The set of target devices may include substantially any electronic device or computing system that can be configured to obtain access to a communications network, including servers, desktop computers, laptop computers, smartphones, Internet of Things (IoT) devices, network switches and routers, memory devices, storage devices, and others. The set of target devices may also include electronic devices and systems included in vehicles, satellites, industrial production and distribution systems, and others. In some embodiments, the set of target devices comprises an electronic device incorporated within a vehicle's control systems or Human Machine Interface (HMI) systems. The task may include instructions that direct the operation of one or more computer processes in the target device, such as the execution of a command or a code module, changing the values of one or more configuration parameters, implementing software updates or patches, downloading new data packages or software tools, and others.

At block 404, an automation package comprising the task is generated. The automation package may also include additional tasks that are directed to the same target device. In some embodiments, each task may be packaged separately such that each automation package includes a single task.

At block 406, the automation package is encapsulated in one or more messages. Each message includes a topic identifier that identifies a topic corresponding to the set of target devices. The identified topic may be a predetermined topic that has been specified for enabling the specific set of target devices to receive updates. Encapsulating the automation package may include segmenting the automation package into a first segment and a second segment, encapsulating the first segment in a first message, encapsulating the second segment in a second message, and adding header information to each message to enable the automation package to be reassembled by the target devices. In some embodiments, encapsulating the automation package in more than one message may be performed after determining that the size of the automation package generated at block 404 exceeds a message size limit of the message service to which the messages will be published. Each message may also include header information describing aspects of the automation package such as a processing order, an update version, a message publishing date, whether prior messages are deprecated, whether the message contains a portion of a chunked automation package, etc.

At block 408, the one or more messages are sent to a message service to be published to the topic. The set of target devices are configured to subscribe to the topic. Each target device can receive messages asynchronously through the message service, for example, when they are able to connect to a network and establish an open communication channel with the message service 124.

It will be appreciated that embodiments of the method 400 may include additional blocks not shown in FIG. 4. For example, the method 400 may also include receiving acknowledgements from the set of target devices. Each acknowledgement may uniquely identify the specific device and indicate whether specific tasks, or automation packages were successfully executed or received by the specific device. The acknowledgements may be received from the set of target devices asynchronously, for example, through a different topic of the same message service. Accordingly, the method may further include subscribing to an additional topic specified for receiving acknowledgements from the target devices, which are configured to publish to the specified topic. It will be appreciated that some of the blocks shown in FIG. 4 may be omitted. Additionally, the processes associated with blocks 402 through 412 may be performed in a different order than what is shown in FIG. 4.

Figure 5:
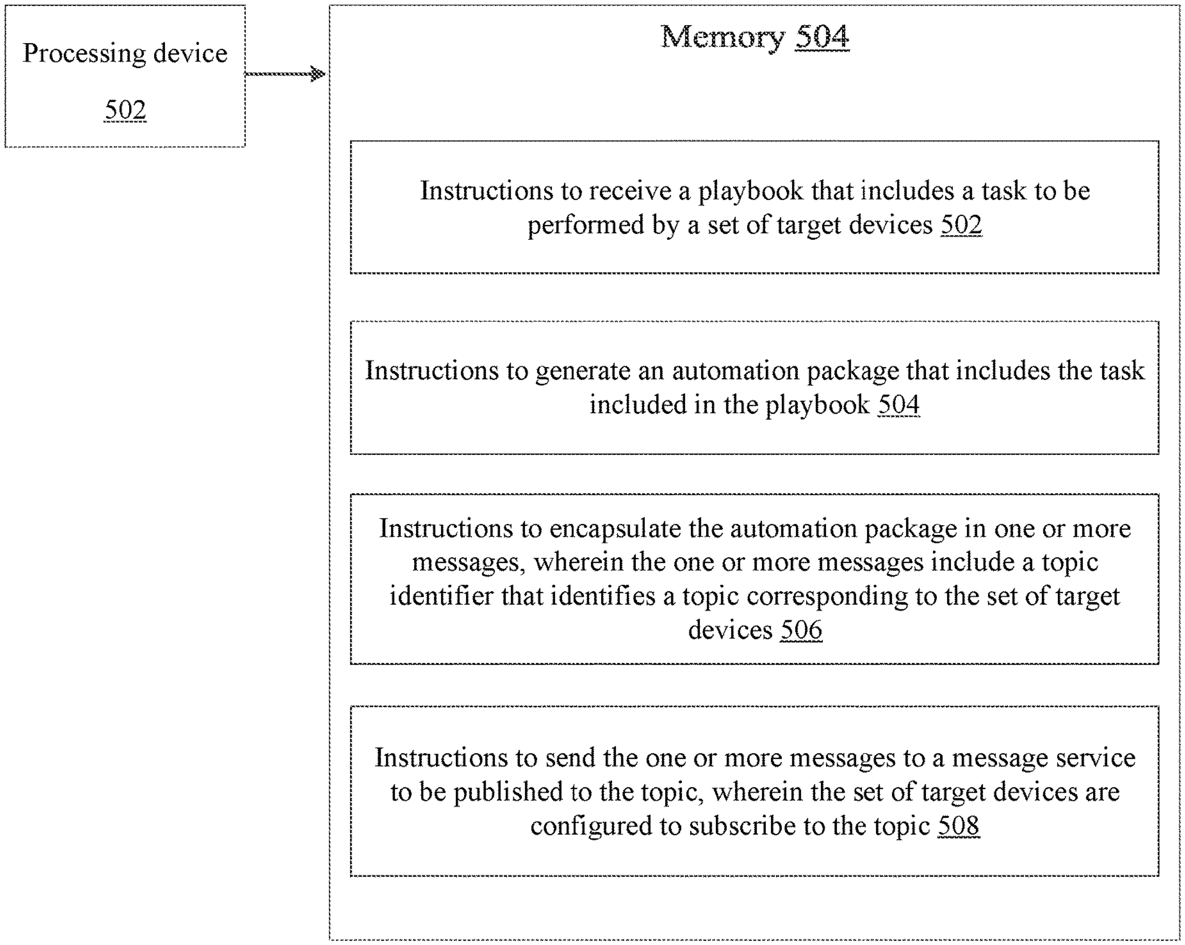
FIG. 5 is a simplified block diagram of a system for distributing automation packages in accordance with some embodiments of the present disclosure.

FIG. 5 is a simplified block diagram of a system for distributing automation packages in accordance with some embodiments of the present disclosure. The system 500 includes a processing device 502 operatively coupled to a memory 504. The memory 504 can include instructions that are executable by the processing device 502 to cause the processing device 502 to distribute automation packages. The system 500 may be implemented in any suitable computing architecture, including the computing system 102 of FIG. 1.

The memory 504 includes instructions 506 to receive a playbook that includes a task to be performed by a set of target devices. The memory 504 also includes instructions 508 to generate an automation package containing the task included in the playbook. The memory 504 also includes instructions 510 to encapsulate the automation package in one or more messages, wherein the one or more messages include a topic identifier that identifies a topic corresponding to the set of target devices. The memory 504 also includes instructions 510 to send the one or more messages to a message service to be published to the topic, wherein the set of target devices are configured to subscribe to the topic.

It will be appreciated that embodiments of the system 500 may include additional blocks not shown in FIG. 5 and that some of the blocks shown in FIG. 5 may be omitted. For example, the system 500 may include instructions for receiving, processing, and storing acknowledgements received from the target devices.

Figure 6:
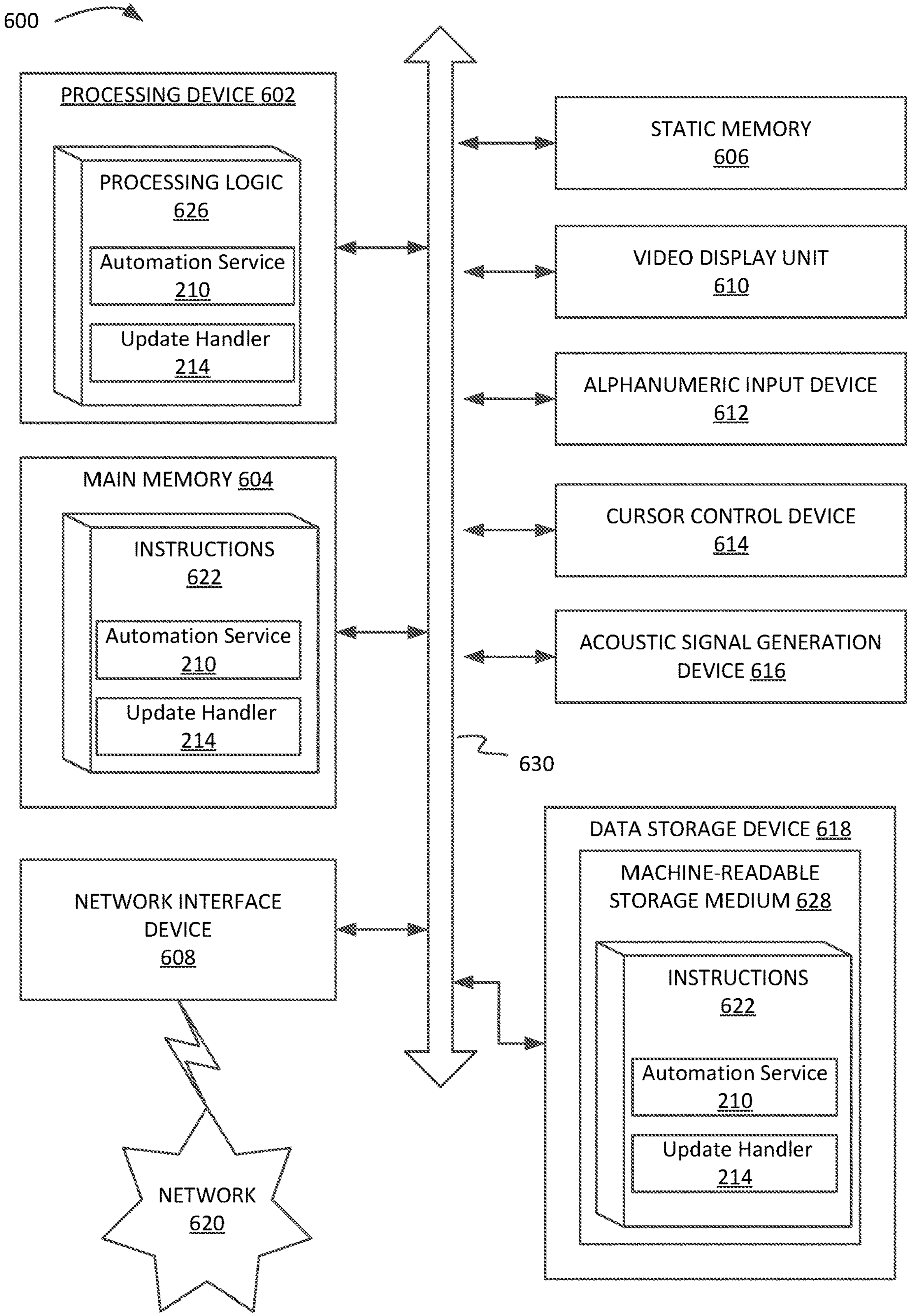
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments of the present disclosure. Computing device 600 may be connected to other computing devices in a LAN, an intranet, an extranet, and/or the Internet. The computing device 600 may operate in the capacity of a server machine in client-server network environment or in the capacity of a client in a peer-to-peer network environment. The computing device may be provided by a personal computer (PC), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 624.

Processing device 602 may be provided by one or more general-purpose processing devices such as a microprocessor, central processing unit, or the like. In an illustrative example, processing device 602 may be include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 622 for carrying out the operations described herein, in accordance with one or more aspects of the present disclosure. For example, the sets of instructions 622 may include the automation service 210 and the update handler 214 described in relation to FIG. 2. The automation service 210 and the update handler 214 may also reside, completely or at least partially, within main memory 604 and/or within processing device 602 (e.g. within processing logic 626) during execution thereof by computing device 600, main memory 604 and processing device 602 also constituting computer-readable media. The automation service 210 and the update handler 214 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending," "receiving," "generating," "encapsulating," "adding," "updating," "providing," "publishing," "subscribing" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the techniques to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the disclosure is not to be limited to the details given herein, but may be modified within the scope and equivalents of the appended claims.

What is claimed is:

1. A method comprising:

receiving a playbook that includes a task to be performed by a set of target devices;

generating an automation package that comprises the task included in the playbook;

encapsulating the automation package in one or more messages, wherein the one or more messages include a topic identifier that identifies a topic corresponding to the set of target devices; and sending, by a processing device, the one or more messages to a message service to be published to the topic, wherein the set of target devices are configured to subscribe to the topic, wherein the set of target devices connect with the message service to determine availability of the topic for retrieval, wherein a specific device of the set of target devices sends an acknowledgement including at least status information related to successful retrieval of the topic and successful execution of the topic by the specific device, wherein the acknowledgement is utilized to maintain a log of automation data associated with the automation package.

2. The method of claim 1, wherein the playbook is an Ansible playbook comprising the task and a plurality of additional tasks to be performed by additional sets of target devices.

3. The method of claim 1, wherein the task comprises execution of a code module to perform at least one of:

changing a value of a configuration parameter; or implementing a software update.

4. The method of claim 1, wherein the message service is a message bus that operates according to an Advanced Message Queuing Protocol (AMQP) or Message Queuing Telemetry Transport (MQTT) protocol.

5. The method of claim 1, wherein the task includes a device identifier that identifies the set of target devices, the method further comprising selecting the topic identifier that corresponds with the device identifier.

6. The method of claim 1, further comprising asynchronously receiving the acknowledgement from the specific device of the set of target devices, wherein the acknowledgement is further configured to identify the specific device and to indicate whether the task was successfully executed by the specific device.

7. The method of claim 1, comprising subscribing to an additional topic specified for receiving acknowledgements from the set of target devices, wherein each device in the set of target devices is configured to publish to the additional topic.

8. The method of claim 1, further comprising adding header information to the one or more messages, wherein the header information indicates that prior messages stored to the topic and associated with prior automation packages are deprecated.

9. The method of claim 1, wherein encapsulating the automation package in one or more messages comprises:

segmenting the automation package into a first segment and a second segment;

encapsulating the first segment in a first message of the one or more messages;

encapsulating the second segment in a second message of the one or more messages; and adding header information to each of the one or more messages to enable the automation package to be reassembled by each of the set of target devices.

10. The method of claim 1, wherein the set of target devices comprises an electronic device incorporated within a vehicle's control systems or Human Machine Interface (HMI) systems.

11. A system comprising:

a memory; and a processing device, operatively coupled to the memory, the processing device to:

receive a playbook that includes a task to be performed by a set of target devices;

generate an automation package that includes the task included in the playbook;

encapsulate the automation package in one or more messages, wherein the one or more messages include a topic identifier that identifies a topic corresponding to the set of target devices; and send the one or more messages to a message service to be published to the topic, wherein the set of target devices are configured to subscribe to the topic, wherein the set of target devices connect with the message service to determine availability of the topic for retrieval, wherein a specific device of the set of target devices sends an acknowledgement including at least status information related to successful retrieval of the topic and successful execution of the topic by the specific device, wherein the acknowledgement is utilized to maintain a log of automation data associated with the automation package.

12. The system of claim 11, wherein the playbook is an Ansible playbook comprising the task and a plurality of additional tasks to be performed by additional sets of target devices.

13. The system of claim 11, wherein the task includes a device identifier that identifies the set of target devices, and wherein the processing device is further to select the topic identifier that corresponds with the device identifier.

14. The system of claim 11, wherein the processing device is further to asynchronously receive the acknowledgement from the specific device of the set of target devices, wherein the acknowledgement is further configured to identify the specific device and indicate whether the task was successfully executed by the specific device.

15. The system of claim 11, wherein the processing device is further to subscribe to an additional topic specified for receiving acknowledgements from the set of target devices, wherein each device in the set of target devices is configured to publish to the additional topic.

16. The system of claim 11, wherein the processing device is further to add header information to the one or more messages, wherein the header information indicates that prior messages stored to the topic and associated with prior automation packages are deprecated.

17. The system of claim 11, wherein to encapsulate the automation package in one or more messages comprises to:

segment the automation package into a first segment and a second segment;

encapsulate the first segment in a first message of the one or more messages;

encapsulate the second segment in a second message of the one or more messages; and add header information to each of the one or more messages to enable the automation package to be reassembled by each of the set of target devices.

18. A non-transitory computer-readable storage medium including instructions that, when executed by a processing device, cause the processing device to:

receive a playbook that includes a task to be performed by a set of target devices;

generate an automation package that includes the task included in the playbook;

encapsulate the automation package in one or more messages, wherein the one or more messages include a topic identifier that identifies a topic corresponding to the set of target devices; and send, by the processing device, the one or more messages to a message service to be published to the topic, wherein the set of target devices are configured to subscribe to the topic, wherein the set of target devices connect with the message service to determine availability of the topic for retrieval, wherein a specific device of the set of target devices sends an acknowledgement including at least status information related to successful retrieval of the topic and successful execution of the topic by the specific device, wherein the acknowledgement is utilized to maintain a log of automation data associated with the automation package.

19. The non-transitory computer-readable storage medium of claim 18, wherein the instructions further cause the processing device to subscribe to an additional topic specified for receiving acknowledgements from the set of target devices, wherein each device in the set of target devices is configured to publish to the additional topic.

20. The non-transitory computer-readable storage medium of claim 18, wherein the instructions further cause the processing device to add header information to the one or more messages, wherein the header information indicates that prior messages stored to the topic and associated with prior automation packages are deprecated.

* * * * *